US011252182B2

(12) United States Patent
Bilas et al.

(10) Patent No.: US 11,252,182 B2
(45) Date of Patent: Feb. 15, 2022

(54) IDENTIFYING MALICIOUS CLIENT NETWORK APPLICATIONS BASED ON NETWORK REQUEST CHARACTERISTICS

(71) Applicant: CLOUDFLARE, INC., San Francisco, CA (US)

(72) Inventors: Maciej Bilas, Warsaw (PL); John Graham-Cumming, London (GB); Marek Majkowski, Warsaw (PL)

(73) Assignee: CLOUDFLARE, INC., San Francisco, CA (US)

( * ) Notice: Subject to any disclaimer, the term of this patent is extended or adjusted under 35 U.S.C. 154(b) by 275 days.

(21) Appl. No.: 16/417,367

(22) Filed: May 20, 2019

(65) Prior Publication Data
US 2020/0374297 A1  Nov. 26, 2020

(51) Int. Cl.
H04L 29/06 (2006.01)
H04L 9/32 (2006.01)
H04L 12/26 (2006.01)
H04L 29/08 (2006.01)

(52) U.S. Cl.
CPC .......... H04L 63/145 (2013.01); H04L 9/3271 (2013.01); H04L 43/04 (2013.01); H04L 63/1458 (2013.01); H04L 67/146 (2013.01)

(58) Field of Classification Search
CPC ............... H04L 63/145; H04L 63/1416; H04L 63/1408; H04L 61/2592; G06F 21/56; G06F 9/45558; G06F 16/953; H04W 12/128
USPC .......................................................... 726/22
See application file for complete search history.

(56) References Cited

U.S. PATENT DOCUMENTS

| 7,660,815 | B1 * | 2/2010 | Scofield ................ G06F 16/951 707/999.102 |
| 7,797,421 | B1 * | 9/2010 | Scofield .................. H04L 67/02 709/224 |
| 7,966,395 | B1 * | 6/2011 | Pope .................... G06F 16/9535 709/224 |
| 8,386,509 | B1 * | 2/2013 | Scofield ................ G06F 16/335 707/769 |

(Continued)

FOREIGN PATENT DOCUMENTS

WO  WO-2020092093 A1 *  5/2020  ......... G06F 16/5838

OTHER PUBLICATIONS

Kaszuba et al., "RoSmEEry: Robotic Simulated Environment for Evaluation and Benchmarking of Semantic Mapping Algorithms", 2021 (Year: 2021).*

(Continued)

*Primary Examiner* — Ondrej C Vostal
(74) *Attorney, Agent, or Firm* — Nicholson De Vos Webster & Elliott LLP

(57) ABSTRACT

An edge server receives a plurality of requests from a client network application for actions to be performed on a resource that is hosted at an origin server. The edge server determines request attributes of the requests and associates the request attributes with a session identifying the client network application. The edge server generates a confidence value for the client network application based at least on the determined request attributes of the plurality of requests and computed session metrics of the session. When the confidence value indicates that the client network application is malicious, the edge server performs one or more mitigation actions.

15 Claims, 4 Drawing Sheets

(56) References Cited

U.S. PATENT DOCUMENTS

| | | | | |
|---|---|---|---|---|
| 8,893,278 | B1* | 11/2014 | Chechik | G06F 21/56 |
| | | | | 726/24 |
| 9,398,028 | B1* | 7/2016 | Karandikar | H04L 63/1408 |
| 9,596,266 | B1* | 3/2017 | Coleman | G06F 21/316 |
| 9,645,789 | B1* | 5/2017 | Lee | G06F 21/31 |
| 10,050,998 | B1* | 8/2018 | Singh | H04L 63/145 |
| 10,104,039 | B1* | 10/2018 | Knecht | H04L 61/2592 |
| 10,270,794 | B1* | 4/2019 | Mukerji | H04L 63/1425 |
| 10,341,355 | B1* | 7/2019 | Niemoller | G06F 21/566 |
| 10,382,300 | B2* | 8/2019 | Ellenbogen | G06K 9/6273 |
| 10,523,609 | B1* | 12/2019 | Subramanian | H04L 63/1416 |
| 10,853,424 | B1* | 12/2020 | Mandaviya | G06N 7/005 |
| 10,887,348 | B1* | 1/2021 | Brandwine | H04L 63/166 |
| 2009/0013400 | A1* | 1/2009 | Mokhtari | H04L 63/1441 |
| | | | | 726/13 |
| 2010/0235879 | A1* | 9/2010 | Burnside | H04L 63/1425 |
| | | | | 726/1 |
| 2011/0307956 | A1* | 12/2011 | Yermakov | G06F 21/563 |
| | | | | 726/24 |
| 2013/0247212 | A1* | 9/2013 | Muriello | G06F 21/60 |
| | | | | 726/26 |
| 2014/0108788 | A1* | 4/2014 | Edstrom | H04L 9/3268 |
| | | | | 713/156 |
| 2014/0215631 | A1* | 7/2014 | Tao | H04L 63/1483 |
| | | | | 726/25 |
| 2014/0317741 | A1* | 10/2014 | Be'ery | H04L 63/1408 |
| | | | | 726/23 |
| 2014/0330563 | A1* | 11/2014 | Faians | G10L 17/22 |
| | | | | 704/236 |
| 2015/0341383 | A1* | 11/2015 | Reddy | H04L 63/1466 |
| | | | | 726/22 |
| 2015/0363485 | A1* | 12/2015 | Bennett | G06F 16/951 |
| | | | | 707/694 |
| 2015/0372980 | A1* | 12/2015 | Eyada | H04L 63/1416 |
| | | | | 726/1 |
| 2016/0021117 | A1* | 1/2016 | Harmon | H04L 63/105 |
| | | | | 726/1 |
| 2016/0373412 | A1* | 12/2016 | MacCarthaigh | H04L 63/062 |
| 2018/0241721 | A1* | 8/2018 | Harvey | H04L 63/1425 |
| 2019/0020683 | A1* | 1/2019 | Haerterich | H04L 63/1491 |
| 2019/0312846 | A1* | 10/2019 | Taylor | H04L 63/1483 |
| 2019/0334940 | A1* | 10/2019 | Bar Noy | H04L 63/20 |
| 2020/0142978 | A1* | 5/2020 | Salokhe | G06F 16/532 |
| 2020/0169483 | A1* | 5/2020 | Kursun | H04L 63/1408 |
| 2020/0244674 | A1* | 7/2020 | Arzani | H04L 63/1441 |

OTHER PUBLICATIONS

Mohan et al., "Atribute Trust—a Framework for Evaluating Trust in Aggregated Attributes via a Reputation System", 2008 (Year: 2008).*

Beitollahi et al., "Tackling Application-layer DDoS Attacks", 2012 (Year: 2012).*

Carlin et al., "Intrusion Detection and Countermeasure of Virtual Cloud Systems—State of the Art and Current Challenges", 2015 (Year: 2015).*

Crampton et al., "PTaCL: A Language for Attribute-Based Access Control in Open Systems", 2012 (Year: 2012).*

Demchenko et al., "Web Services and Grid Security Vulnerabilities and threats Analysis and Model", 2005 (Year: 2005).*

Frikken et al., "Attribute-Based Access Control with Hidden Policies and Hidden Credentials", 2006 (Year: 2006).*

Hallaraker et al., "Detecting Malicious JavaScript Code in Mozilla", 2005 (Year: 2005).*

Schmidt et al., "Static Analysis of Executables for Collaborative Malware Detection on Android", 2009 (Year: 2009).*

Seifert et al., "Identification of Malicious Web Pages with Static Heuristics", 2008 (Year: 2008).*

Sun et al., "Surveying and Analyzing Security, Privacy and Trust Issues in Cloud Computing Environments", 2011 (Year: 2011).*

Vissers et al., "DDoS defense system for web services in a cloud environment", 2014 (Year: 2014).*

* cited by examiner

IDENTIFYING MALICIOUS CLIENT NETWORK APPLICATIONS BASED ON NETWORK REQUEST CHARACTERISTICS

FIELD

Embodiments of the invention relate to the field of network communications; and more specifically, to identifying malicious client network applications based on network request characteristics.

BACKGROUND

Internet hosts are concerned with maintaining high security, performance, and reliability of their hosted resources, such as websites. As the popularity of a resource increases, so does the amount of network traffic that is directed to the resource. A resource can also be targeted by attacks from bots attempting to make a resource unavailable to legitimate users by flooding a resource with requests, commonly referred to as a distributed denial-of-service (DDoS) attack, or to abuse the functionality of the website (e.g., content scraping, credential stuffing, slow brute force attacking, medium-volume attacks at slow endpoints). Heavy traffic caused by attacking bots can affect the security, performance and reliability of a resource.

Conventional security solutions typically either fingerprint the user agent by what is included in the request headers or present a challenge to gather additional information for fingerprinting. The fingerprint signatures are then used to classify traffic. The signatures can take different forms: a specific header order, client IP address, support of JavaScript, CAPTCHA solution status, and/or a machine learned classifier score. These signatures may be used in conjunction with traffic volume to classify a DDoS attack. However, these conventional security solutions do not effectively detect and stop attacks that are designed to abuse the functionality of the website.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
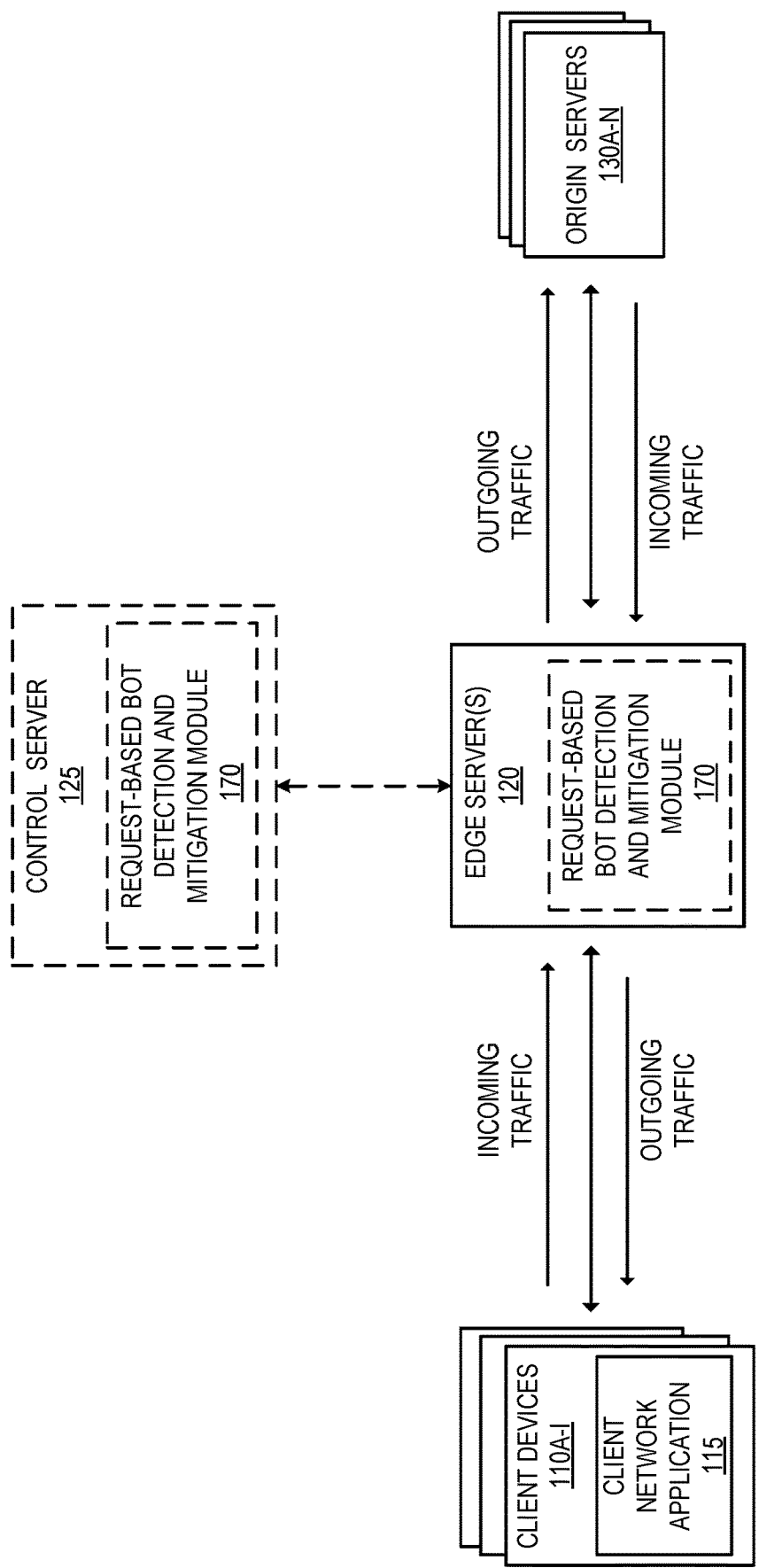
FIG. 1 illustrates an exemplary system according to some embodiments described herein.

A server identifies and mitigates attacks that are designed to abuse the functionality of a website. A server receives a request from a client device regarding a resource that is hosted at the server. For example, the request may be an HTTP/S GET request method for the resource. The server determines one or more request attributes and associates them with an HTTP session associated with the request. For instance, timing information of the request and one or more characteristics of the request are recorded and associated with its session. The timing information includes when the request was received (e.g., date and/or time). The one or more characteristics of the request include request "Accept", "Accept-Language" header value, requested resource path, presence of a session cookie, response status code, content type, and cache status (e.g., whether the resource was available in cache or not), etc. A session is typically a collection of multiple requests and responses of the client network application, and can be identified by the TCP connection, by a cookie, by an IP address of the client network application, by the pair of the IP address of the client network application and user-agent, or any combination thereof. In some embodiments, a session is an ordered collection of multiple requests and responses of the client network application. In such embodiments, request-response pairs can be chronologically ordered.

One or more session metrics are computed of the session including one or more of: the duration of the session, the number of requests received of the session, the ratio of the number of failed requests compared to the number of successful requests during the session, inter-request gap distribution (e.g., the amount of time passing from the previous request to the current request), request content-type distribution, inter-request timings for specific content types (e.g., inter-request timings for HTML pages and/or JSON objects, the components of a requested resource [images, javascript files, videos, etc.]), response code distribution, and/or HTTP method distribution. One or more zone-wide metrics (of all sessions for a zone over a predetermined time) may also be computed including one or more of: the median duration of all sessions, the median number of requests per session across all sessions, the number of failed requests compared to the number of successful requests across all sessions, inter-request gap distribution across all sessions (e.g., the amount of time passing from one request to another request during the sessions), request content-type distribution across the sessions, inter-request timings for specific content types across the sessions (e.g., inter-request timings for HTML pages), response code distribution across the sessions, and/or HTTP method distribution across the sessions. The ratios between the per-session metrics the zone-wide metrics may also be computed.

A comparison is made between the current request and/or session with historical data analyzed from previous requests and/or sessions to determine whether a client network application is malicious (e.g., a bot that serves malicious purposes). In an embodiment, the calculated values are scored against a previously trained machine learning model to determine if the client network application is malicious or not. Based on the analysis of the information of the request and its session, a confidence value is generated indicating whether the client network application is malicious. When the confidence value indicates that the client network application is malicious, the server performs one or more mitigation actions. For example, the server can block the request or flag the request. When the confidence value indicates that the client network application is not malicious, the server processes the request in its normal way (e.g., where the server is an edge server, the edge server may send the request to an origin server hosting a requested resource). In embodiments where the confidence value is generated offline and not on the request path (e.g., computed by a centralized server), the server can perform one or more mitigation actions (e.g., drop the request) in response to receiving a subsequent request from a client network application that matches a particular IP address and/or a fingerprint of a particular client network application.

In conventional security solutions, systems can detect DDoS attacks by identifying an atypical volume of traffic (e.g., a larger number of network requests than expected), and mitigate the DDoS attack by blocking certain traffic. Also, other conventional security solutions either fingerprint the user agent by what is included in the request headers or present a challenge to gather additional information for fingerprinting, that can be used in combination with traffic volume to classify DDoS attack traffic. However, these conventional security solutions do not effectively detect and stop attacks that are designed to abuse the functionality of the website.

In contrast, embodiments described herein allow the for the detection and mitigation of attacks that are designed to abuse the functionality of the website. Embodiments of the invention provide many technical advantages, in addition to addressing the deficiencies of previous solutions. For example, embodiments of the invention evaluate a stream of requests (or multiple requests) from a session versus looking at just the volume of traffic. As noted above, conventional security solutions are designed to detect DDoS attacks. In contrast, by evaluating a stream of requests from a session, embodiments of the invention can detect other types of attacks, such as content scraping and credential stuffing.

FIG. 1 illustrates an exemplary network architecture that use embodiments described herein. The service illustrated in FIG. 1 includes edge server(s) 120 that are situated between client computing devices 110A-I and origin server(s) 130A-N. In one embodiment, edge server(s) 120 are reverse proxy servers. In one embodiment, certain network traffic is received and processed through edge server(s) 120. For example, web traffic (e.g., HTTP requests/responses, HTTPS requests/responses, SPDY requests/responses, HTTP/2 requests, responses, etc.) for domains handled by origin servers 130A-N may be received and processed at edge server(s) 120. In one embodiment, domain owners are customers of the cloud-based edge service and certain network traffic for their websites are received and processed at edge server(s) 120.

Client devices 110A-I are computing devices (e.g., laptops, workstations, smartphones, palm tops, mobile phones, tablets, gaming systems, set top boxes, wearable devices, electronic devices, etc.) that are capable of transmitting and/or receiving network traffic. The network traffic may be legitimate network traffic or illegitimate network traffic (e.g., traffic that is part of an attack). Each of client devices 110A-I executes client network application 115 that is capable of transmitting and/or receiving network traffic. For example, client network application 115 may be a web browser or other application that can access network resources (e.g., web pages, images, JSON documents, word processing documents, PDF files, movie files, music files, or other computer files). The client network application may be a scripting application or other application that may be participating in an attack. The client network application 115 may be a legitimate client network application that sends legitimate network traffic or may be a malicious client network application that sends malicious network traffic (e.g., a bot that is designed to abuse the functionality of the website).

Origin servers 130A-N are computing devices that may serve and/or generate network resources (e.g., web pages, images, word processing documents, PDF files movie files, music files, or other computer files). Origin server 130A-N may also be another edge server to the server that serves and/or generates network resources. Although not illustrated in FIG. 1, it should be understood that the network resources of origin servers 130A-N may be stored separately from the device that responds to the requests. Some of origin servers 130A-N may handle multiple domains that resolve to edge server(s) 120.

Although not illustrated in FIG. 1, in one embodiment the service includes multiple nodes (referred herein as "edge service nodes"). Each edge service node may include any of one or more edge servers, one or more control servers, one or more DNS servers (e.g., one or more authoritative name servers), and one or more other pieces of networking equipment (e.g., one or more routers, switches, hubs, etc.). The edge service node may be part of the same physical device or multiple physical devices. For example, the edge server(s), control server(s), and DNS server(s) may be virtual instances running on the same physical device or may be separate physical devices. Each edge service node may be part of a data center or a collocation site.

The service may also include control server 125, which may be owned or operated by the service. In one embodiment, control server 125 provides a set of tools and interfaces for customers (e.g., domain owners) to configure security settings of the service. In some embodiments, control server 125 may be used to send a command to edge server(s) 120 to perform the classification of requests to identify whether requests are from malicious or non-malicious client network applications, as described herein.

In some embodiments, the service includes multiple edge servers that are geographically distributed. For example, in some embodiments, the service uses multiple edge service nodes that are geographically distributed to decrease the distance between requesting client devices and content. The authoritative name servers may have a same anycast IP address and the edge servers may have a same anycast IP address. As a result, when a DNS request is made, the network transmits the DNS request to the closest authoritative name server (in terms of the routing protocol metrics). That authoritative name server then responds with one or more IP addresses of one or more edge servers within the edge service node. Accordingly, a visitor will be bound to that edge server until the next DNS resolution for the requested hostname (according to the TTL ("time to live") value as provided by the authoritative name server). In some embodiments, instead of using an anycast mechanism, embodiments use a geographical load balancer to route traffic to the nearest edge service node.

To classify the requests to determine a likelihood of whether the traffic is being received from a non-malicious client network application (e.g., from a human user that is not attacking the website) versus a malicious client network application, the service analyzes requests received by edge server(s) 120 from client network applications (e.g., client network application 115) operating on client devices (e.g., client devices 110A-I). Edge server(s) 120 includes request-based bot detection and mitigation module 170 that is configured to receive requests to access resources hosted by origin server 130A-N. In addition, request-based bot detection and mitigation module 170 on control server 125 and/or edge server(s) 120 is further configured to analyze attributes of the requests and session metrics, determine whether a client network application is likely malicious based on the determined attributes and session metrics, and perform one or more mitigation actions as appropriate.

In one embodiment, request-based bot detection and mitigation module 170 determines for each request, one or more request attributes and associates the request attributes with its session. For example, the one or more request attributes may include timing information of the request and one or more characteristics of the request. The timing information includes when the request was received (e.g., date and/or time). The one or more characteristics of the request include response status code, content type, etc. The HTTP session can be identified by the TCP connection, by a cookie, by an IP address of the client network application, by the pair of the IP address of the client network application and user-agent, or any combination thereof. In an embodiment, a request-based bot detection and mitigation module 170 on the edge server 120 may determine the request attribute(s) and the session identifier for each request and transmit that information to the request-based bot detection and mitigation module 170 on the control server 125 for further processing including calculating the confidence value offline.

The request-based bot detection and mitigation module 170 computes one or more session metrics for the session including one or more of: the duration of the session, the number of requests received of the session, the ratio of the number of failed requests compared to the number of successful requests during the session, inter-request gap distribution (e.g., the amount of time passing from the previous request to the current request), request content-type distribution, inter-request timings for specific content types (e.g., inter-request timings for HTML pages), response code distribution, and/or HTTP method distribution. The request-based bot detection and mitigation module 170 also computes one or more zone-wide metrics (of all sessions for a zone over a predetermined time) including one or more of: the duration of all sessions, the number of requests across all sessions, the number of failed requests compared to the number of successful requests across all sessions, inter-request gap distribution across all sessions (e.g., the amount of time passing from one request to another request during the sessions), request content-type distribution across the sessions, inter-request timings for specific content types across the sessions (e.g., inter-request timings for HTML pages), response code distribution across the sessions, and/or HTTP method distribution across the sessions. The ratios between the per-session metrics the zone-wide metrics may also be computed.

The request-based bot detection and mitigation module 170 determines, using the request attributes and the session metrics, a likelihood of whether the traffic is being received from a legitimate client network application (e.g., from a human user that is not attacking the website) versus a malicious client network application (e.g., an attacking bot). In an embodiment, the calculated values are scored against a previously trained machine learning model to determine if the client network application is malicious or not. The machine learning module may produce a confidence value indicating whether the client network application is suspected to be malicious.

If it is determined that the client network application is suspected to be malicious, the request-based bot detection and mitigation module 170 performs one or more mitigation actions. For example, the request may be dropped. As another example, a reputation score for the client network application (e.g., as identified through the source IP address of the client network application) may be lowered that may cause future requests from the client network application to be blocked or challenged (e.g., via a CAPTCHA). In some embodiments, edge server 120 creates a "(request label, request confidence %)" tuple as metadata associated with the request. In such embodiments, a filter-based firewall can retrieve the metadata associated with the request and block the request.

In one embodiment, request-based bot detection and mitigation module 170 performs the above-noted operations on a request in real-time prior to further processing (e.g., prior to sending the request to its origin server). In other embodiments, request-based bot detection and mitigation module 170 performs the above-noted operations on a request asynchronously with sending the request to origin servers 130A-N or offline after sending the request to origin servers 130A-N.

Figure 2:
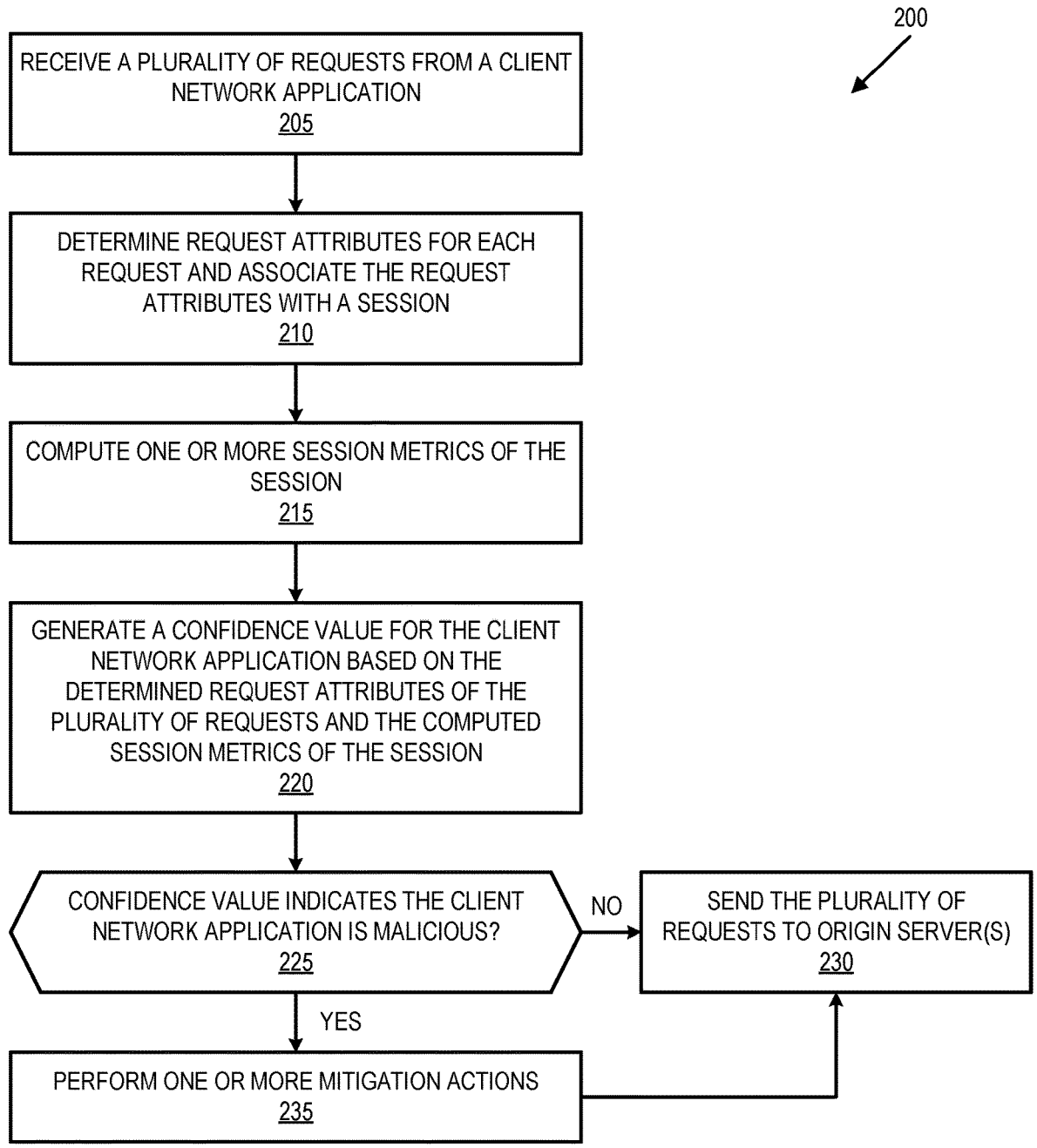
FIG. 2 is a flow diagram that illustrates exemplary operations for identifying malicious client network applications along a request path based on request attributes and session metrics according to an embodiment, according to an embodiment.

FIG. 2 is a flow diagram 200 that illustrates exemplary operations for identifying malicious client network applications along a request path based on request attributes and session metrics according to an embodiment. The operations of FIG. 2 will be described with reference to the exemplary embodiment of FIG. 1. However, it should be understood that the operations of FIG. 2 can be performed by embodiments of the invention other than those discussed with reference to FIG. 1, and the embodiments discussed with reference to FIG. 1 can perform operations different than those discussed with reference to FIG. 2. The operations of FIG. 2 are described as being performed by an edge server (e.g., edge server 120). However, in some embodiments, the operations are performed by another device (e.g., control server 125, origin servers 130A-N, etc.). In some embodiments, the operations are performed by request-based bot detection and mitigation module 170 operating on edge server(s) 120, control server 125, or origin servers 130A-N.

At operation 205, an edge server (e.g., one edge server from set of edge servers 120) receives a plurality of requests from a client network application. In one embodiment, each request in the plurality of requests is for an action to be performed on a resource that is hosted at an origin server. For example, edge server 120 receives a plurality of HTTP "GET" requests to access resources hosted by one or more origin servers (e.g., origin servers 130A-N). In one embodiment, each request is received by edge server 120 as a result of a DNS for the hostname resolving to an IP address of edge server 120 instead of resolving to an IP address of origin server 130A. For example, a requested resource is an HTML page located at, e.g., www.example.com. In one embodiment, edge server 120 receives the request for the resource from client network application 115 (e.g., a browser or other network application) operating on a client device (e.g., client device 110A). In one embodiment, edge server 120 receives the request as part of an HTTP session from client device 110A.

At operation 210, edge server 120 determines one or more request attributes for each request in the plurality of requests and associates the one or more request attributes with a session that identifies the client network application. For example, edge server 120 determines the one or more request attributes, including timing information of the request and one or more characteristics of the request. Characteristics of the request can include an IP address, an order of request headers, whether the request includes a malformed header, etc. The timing information can include when the request was received (e.g., date and/or time). The one or more characteristics of the request include response status code, content type, etc.

Edge server 120 can group the plurality of requests into a session to associate requests that occur within a period of time and received from the same client network application.

In one embodiment, edge server 120 generates a unique session identifier to uniquely identify requests from a particular client network application.

At operation 215, edge server 120 computes one or more session metrics of the session. In one embodiment, session metrics of the session can include information regarding a duration of the session, a number of requests made in the session, a number of unique requests made, a number of unique requests for a specific content-type, and a number of failed and successful requests.

Edge server 120 can determine patterns related to the current requests within a session and/or how the current request relates to previous requests from previous sessions. For example, edge server 120 can determine an inter-request time gap distribution to determine an amount of time passing between requests for a particular resource or type of resource. Edge server 120 can also determine an inter-request time for specific content types to determine an amount of time passing between requests of a specific content type (e.g., HTML pages). Edge server 120 can also determine other characteristics, including: a response content-type distribution, a request HTTP method distribution, a response cache presence distribution, a number of unique paths accessed, and a number of unique paths access with a specific content type (e.g., HTML pages).

Edge server 120 can also determine, based on historical request data, whether the current request exhibits attributes of similar previous requests, or if the current request exhibits abnormal or unexpected behavior. In one embodiment, edge server 120 accesses a database or a data structure storing historical request data. In one embodiment, the historical request data includes attributes of previous requests and previous sessions. In one embodiment, the historical request data includes data for requests previously analyzed by edge server 120 and/or for requests previously analyzed by edge servers other than edge server 120. In one embodiment, edge server 120 retrieves historical request data for previous requests having similar attributes as the current request. For example, edge server 120 can retrieve previous requests having a similar request content type, from the same source as the current request (e.g., the same client network application), requests directed to the same resources as one or more of the plurality of requests, etc. As an example, a shorter amount of time between requests than expected based on the historical request data can indicate the requests are part of a malicious action.

In one embodiment, edge server 120 also computes one or more zone-wide metrics (of all sessions for a zone over a predetermined time) to determine a baseline to compare against the session for the plurality of requests received in operation 205. The one or more zone-wide metrics include one or more of: the duration of all sessions, the number of requests across all sessions, the number of failed requests compared to the number of successful requests across all sessions, inter-request gap distribution across all sessions (e.g., the amount of time passing from one request to another request during the sessions), request content-type distribution across the sessions, inter-request timings for specific content types across the sessions (e.g., inter-request timings for HTML pages), response code distribution across the sessions, and/or HTTP method distribution across the sessions. The ratios between the per-session metrics the zone-wide metrics may also be computed.

In operation 220, edge server 120 generates a confidence value for the client network application based on the analysis of the determined attributes of the plurality of requests, and, based on the computed session metrics of the session.

In one embodiment, edge server 120 generates the confidence value for the request using a machine learning model. In some embodiments, edge server 120 generates the confidence value for the request by applying varying weights to the attributes of the request and session metrics of the session, and to the historical request data.

Edge server 120 also generates the confidence value by retrieving historical request data from a data structure, the historical request data including previous request attributes and previous session metrics associated with previous requests from the client network application. Edge server 120 analyzes the previous request attributes and previous session metrics associated with previous requests to identify patterns between the previous requests and the plurality of requests to generate the confidence value for the client network application.

In one embodiment, the confidence value indicates whether the request has attributes indicating it originates from a malicious client network application or is legitimate network traffic from a non-malicious client network application, an API, or from a trusted source.

In operation 225, edge server 120 determines whether the confidence value indicates the client network application is malicious or non-malicious. Edge server 120 can compare the confidence value against a threshold value. The threshold value can be a default value, a system-defined values, or a user-defined value. When edge server 120 determines that the confidence value for the client network application indicates the client network application is not malicious, the flow proceeds to operation 230. When edge server 120 determines that the confidence value for the client network application indicates the client network application is malicious, the flow proceeds to operation 235.

In operation 230, edge server 120 sends the plurality of requests to the origin servers (e.g., origin servers 130A-N) when edge server 120 determines that the client network application is not malicious (e.g., there is high confidence that the request is not an attacking bot or illegitimate network traffic). In one embodiment, edge server 120 sends the plurality of requests received in operation 205 to the appropriate origin server(s). In one embodiment, edge server 120 stores the requests, including the attributes of the request and the session in a data structure (e.g., the data structure from which edge server 120 previously retrieved historical request data), for use in subsequent analyses of requests received by edge server 120.

In operation 235, edge server 120 performs one or more mitigations action on the request in response to edge server 120 determining that the confidence value indicates the client network application is malicious. In one embodiment, edge server 120 blocks the plurality of requests from transmittal to the origin server(s). In some embodiments, edge server 120 modifies a reputation score associated with the client network application. In such embodiments, when the reputation score is below a threshold value, edge server 120 initiates a challenge process in response to requests from the client network application. In some embodiments, edge server 120 creates a "(request label, request confidence %)" tuple as metadata associated with the request. In such embodiments, a filter-based firewall can retrieve the metadata associated with the request and block the request.

In one embodiment, when the confidence value for the client network application indicates the client network application is malicious, edge server 120 also stores the request, including the attributes of the request and the session in the data structure from which edge server 120 previously retrieved historical request data. When storing the request information, edge server 120 can also flag the stored request information to indicate that the request was determined to have a low confidence (e.g., indications the request originated from malicious client network application) to prevent subsequent requests having similar attributes as the plurality of requests from being sent to the origin server.

Figure 3:
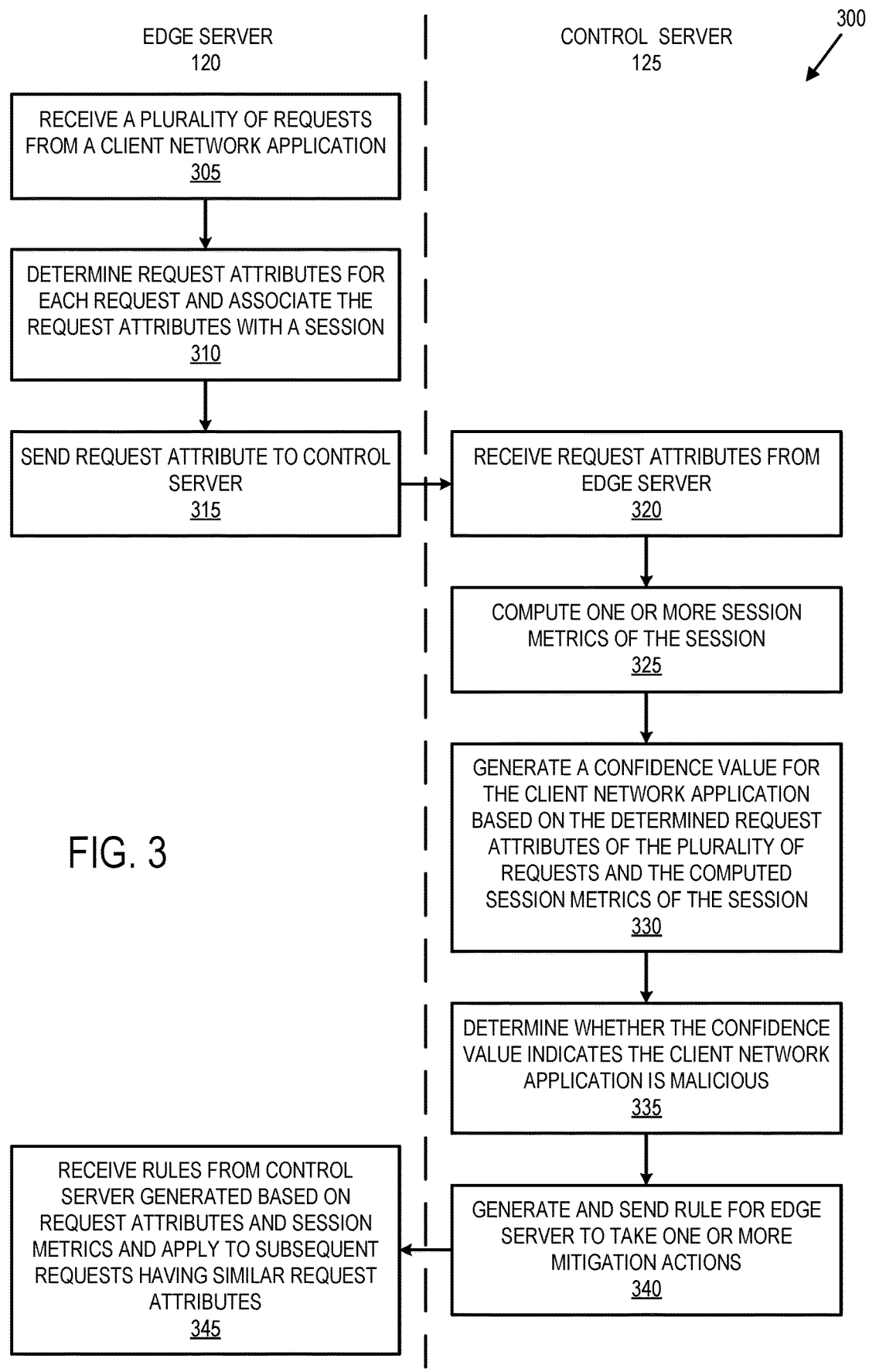
FIG. 3 is a flow diagram that illustrates exemplary operations for identifying malicious client network applications by a centralized server based on request attributes and session metrics according to an embodiment, according to an embodiment.

FIG. 3 is a flow diagram 300 that illustrates exemplary operations for identifying malicious client network applications by a centralized server (e.g., "offline" or outside the request path) based on request attributes and session metrics according to an embodiment. The operations of FIG. 3 will be described with reference to the exemplary embodiment of FIG. 1. However, it should be understood that the operations of FIG. 3 can be performed by embodiments of the invention other than those discussed with reference to FIG. 1, and the embodiments discussed with reference to FIG. 3 can perform operations different than those discussed with reference to FIG. 3. The operations of FIG. 3 are described as being performed by an edge server (e.g., edge server 120) and a central server (e.g., control server 125).

In operation 305, an edge server (e.g., one edge server from set of edge servers 120) receives a plurality of requests from a client network application. In one embodiment, each request in the plurality of requests is for an action to be performed on a resource that is hosted at an origin server. For example, edge server 120 receives a plurality of HTTP "GET" requests to access resources hosted by one or more origin servers (e.g., origin servers 130A-N). In one embodiment, each request is received by edge server 120 as a result of a DNS for the hostname resolving to an IP address of edge server 120 instead of resolving to an IP address of origin server 130A. For example, a requested resource is an HTML page located at, e.g., www.example.com. In one embodiment, edge server 120 receives the request for the resource from client network application 115 (e.g., a browser or other network application) operating on a client device (e.g., client device 110A). In one embodiment, edge server 120 receives the request as part of an HTTP session from client device 110A.

In operation 310, edge server 120 determines one or more request attributes for each request in the plurality of requests and associates the one or more request attributes with a session that identifies the client network application.

In operation 315, edge server 120 sends the determined request attributes from the plurality of requests to control server 125. In this manner, control server 125 performs the analysis of the request attributes outside of the request path.

In embodiments where edge server 120 sends the determined request attributes from the plurality of requests to control server 125 outside of the request path, edge server 120 can send the request to the appropriate origin server prior to, concurrently with, or after sending the determined request attributes from the plurality of requests to control server 125

In operation 320, control server 125 receives the request attributes from edge server 120. In some embodiments, control server 125 receives request attributes from multiple other edge server(s), in addition to the request attributes from edge server 120.

In operation 325, control server 125 computes one or more session metrics of the session. In one embodiment, session metrics of the session can include information regarding duration of the session, a number of requests made in the session, a number of unique requests made, a number of unique requests for a specific content-type, and a number of failed and successful requests. In one embodiment, control server 125 computes one or more session metrics of the session in a like manner as described in operation 215.

In operation 330, control server 125 edge server 120 generates a confidence value for the client network application based on the analysis of the determined attributes of the plurality of requests and based on the computed session metrics of the session. In one embodiment, control server 125 generates the confidence value for the request in a like manner as described in operation 220.

In operation 335, control server 125 determines whether the confidence value indicates the client network application is malicious or non-malicious. In one embodiment, control server 125 determines whether the confidence value indicates the client network application is malicious or non-malicious in a like manner as described in operation 225.

In operation 340, control server 125 generates and sends rule for edge server 120 to take one or more mitigation actions. In some embodiments, control server 125 sends the rules to multiple other edge server(s), in addition to the edge server (e.g., edge server 120) from which control server 125 received the request attributes.

In response to determining whether the confidence value indicates the client network application is malicious or non-malicious, control server 125 generates and/or modifies rules for handling subsequent requests from the client network application. For example, when the client network application is determined to be malicious, control server 125 can generate or modify rules to block subsequent requests exhibiting similar request attributes. In another example, when the client network application is determined to be non-malicious, control server 125 can generate or modify rules to transmit subsequent requests exhibiting similar request attributes to the appropriate origin server.

In operation 345, edge server 120 receives receive rules from control server 125 generated based on the request attributes and session metrics and applies the rules to subsequent requests having similar request attributes. In one embodiment, where control server 125 determines that the client network application is malicious, the rules indicate to edge server 120 to perform mitigation actions in response to edge server 120 receiving a subsequent plurality of requests similar to the plurality of requests received in operation 305. In one embodiment, edge server 120 drops subsequent requests received from the client network application or presents a challenge (e.g., a CAPTCHA) in response to subsequent requests from the client network application. In one embodiment, the rules instruct edge server 120 to take mitigation actions against all the traffic for the associated session, e.g., against traffic associated with the IP address of client device 110A. Mitigation action can also be applied based on a client fingerprint pattern (e.g., header order, presence or absence of a specific header or specific header value, etc.).

Figure 4:
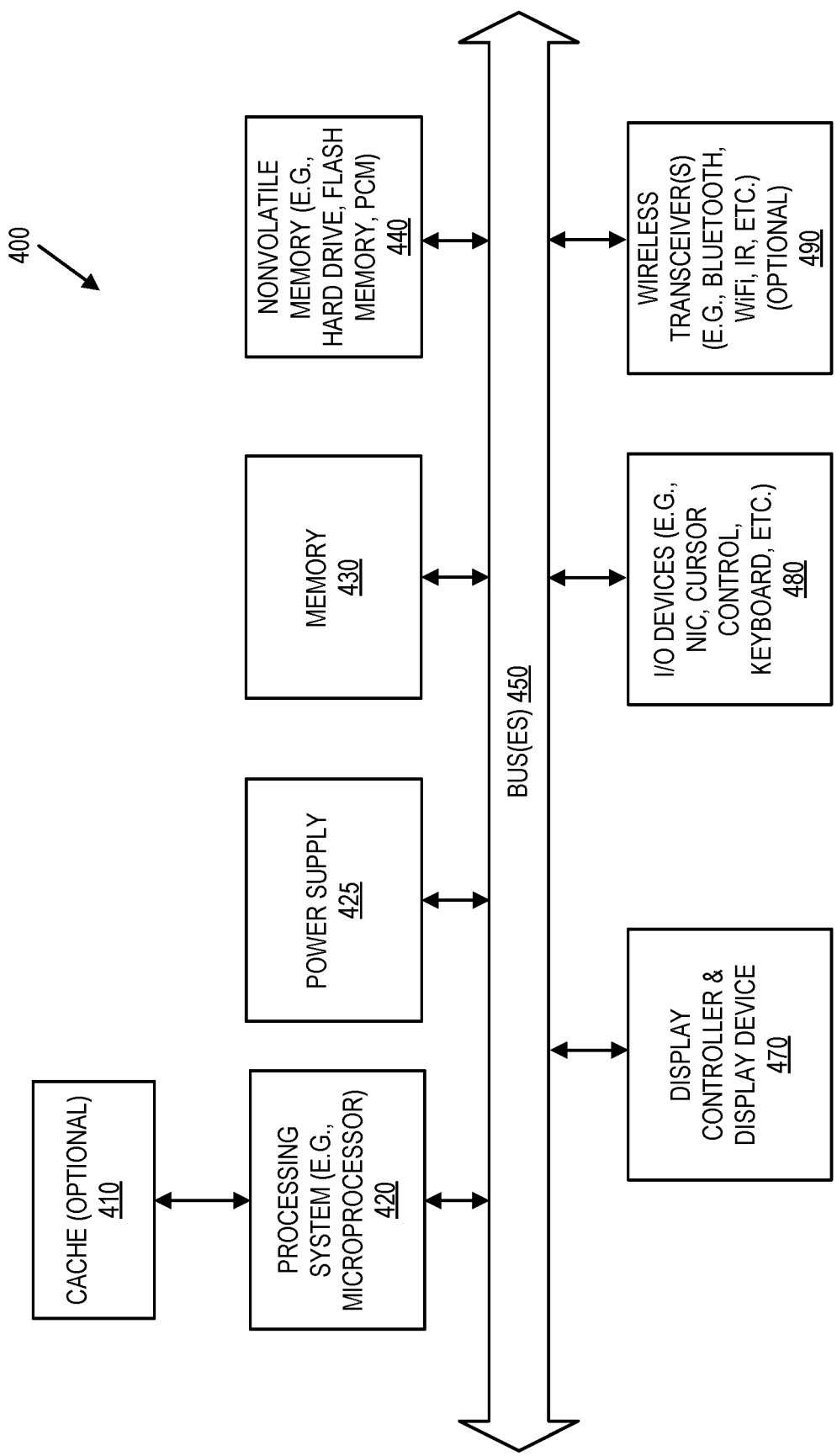
FIG. 4 is a block diagram illustrating a data processing system that can be used in an embodiment.

FIG. 4 is a block diagram illustrating a data processing system that can be used in an embodiment As illustrated in FIG. 4, the computer system 400, which is a form of a data processing system, includes the bus(es) 450 which is coupled with the processing system 420, power supply 425, memory 430, and the nonvolatile memory 440 (e.g., a hard drive, flash memory, Phase-Change Memory (PCM), etc.). In one embodiment, the computer system 100 includes a cache 410. The bus(es) 450 may be connected to each other through various bridges, controllers, and/or adapters as is well known in the art. The processing system 420 may retrieve instruction(s) from the memory 430 and/or the nonvolatile memory 440 and execute the instructions to perform operations described herein. The bus 450 interconnects the above components together and also interconnects those components to the display controller & display device 470, Input/Output devices 480 (e.g., NIC (Network Interface Card), a cursor control (e.g., mouse, touchscreen, touchpad, etc.), a keyboard, etc.), and the optional wireless transceiver(s) 490 (e.g., Bluetooth, Wi-Fi, Infrared, etc.). In one embodiment, the client device, edger servers, control server, and/or origin servers described herein may take the form of the computer system 400.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the preceding description and the claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
   receiving a plurality of requests from a client network application, each request in the plurality of requests for an action to be performed on a resource that is hosted at an origin server;
   for the each request in the plurality of requests, determining one or more request attributes of the request and associating the one or more determined request attributes of the request with a session that identifies the client network application;
   computing one or more session metrics of the session;
   generating a confidence value for the client network application based at least on the determined request attributes of the plurality of requests and the computed session metrics of the session;
   determining that the confidence value indicates that the client network application is malicious;
   in response to determining that the confidence value indicates that the client network application is malicious, performing one or more mitigation actions.

2. The method of claim 1, wherein generating the confidence value for the client network application comprises:
   retrieving historical request data from a data structure, the historical request data including previous request attributes of previous requests from the client network application; and
   analyzing the previous request attributes of the previous requests to identify patterns between the previous requests and the plurality of requests.

3. The method of claim 1, wherein performing the one or more mitigation actions comprises:
   modifying a reputation score associated with the client network application; and
   initiating a challenge process in response to a subsequent request from the client network application.

4. The method of claim 1, wherein performing the one or more mitigation actions comprises:
   blocking the request from transmittal to the origin server.

5. The method of claim 1, further comprising:
   storing the one or more determined request attributes of the request and the session metrics in a data structure;
   comparing request attributes of subsequent requests to the determined request attributes of the requests in the data structure; and
   preventing one or more of the subsequent requests from being sent to the origin server when the request attributes of the one or more of the subsequent requests are similar to the determined request attributes of the requests in the data structure.

6. A non-transitory machine-readable storage medium that provides instructions that, when executed by a processor, cause said processor to perform operations comprising:

receiving a plurality of requests from a client network application, each request in the plurality of requests for an action to be performed on a resource that is hosted at an origin server;

for the each request in the plurality of requests, determining one or more request attributes of the request and associating the one or more determined request attributes of the request with a session that identifies the client network application;

computing one or more session metrics of the session;

generating a confidence value for the client network application based at least on the determined request attributes of the plurality of requests and the computed session metrics of the session;

determining that the confidence value indicates that the client network application is malicious;

in response to determining that the confidence value indicates that the client network application is malicious, performing one or more mitigation actions.

7. The non-transitory machine-readable storage medium of claim 6, wherein generating the confidence value for the client network application comprises:

retrieving historical request data from a data structure, the historical request data including previous request attributes of previous requests from the client network application; and analyzing the previous request attributes of the previous requests to identify patterns between the previous requests and the plurality of requests.

8. The non-transitory machine-readable storage medium of claim 6, wherein performing the one or more mitigation actions comprises:

modifying a reputation score associated with the client network application; and initiating a challenge process in response to a subsequent request from the client network application.

9. The non-transitory machine-readable storage medium of claim 6, wherein performing the one or more mitigation actions comprises:

blocking the request from transmittal to the origin server.

10. The non-transitory machine-readable storage medium of claim 6 that provides instructions that, when executed by the processor, cause said processor to further perform operations comprising:

storing the one or more determined request attributes of the request and the session metrics in a data structure;

comparing request attributes of subsequent requests to the determined request attributes of the requests in the data structure; and preventing one or more of the subsequent requests from being sent to the origin server when the request attributes of the one or more of the subsequent requests are similar to the determined request attributes of the requests in the data structure.

11. An apparatus, comprising:
a processor;
a non-transitory machine-readable storage medium coupled with the processor that stores instructions that, when executed by the processor, cause said processor to perform the following:

receive a plurality of requests from a client network application, each request in the plurality of requests for an action to be performed on a resource that is hosted at an origin server;

for the each request in the plurality of requests, determine one or more request attributes of the request and associating the one or more determined request attributes of the request with a session that identifies the client network application;

compute one or more session metrics of the session;

generate a confidence value for the client network application based at least on the determined request attributes of the plurality of requests and the computed session metrics of the session;

determine that the confidence value indicates that the client network application is malicious;

in response to determining that the confidence value indicates that the client network application is malicious, perform one or more mitigation actions.

12. The apparatus of claim 11, wherein generating the confidence value for the client network application comprises:

retrieving historical request data from a data structure, the historical request data including previous request attributes of previous requests from the client network application; and analyzing the previous request attributes of the previous requests to identify patterns between the previous requests and the plurality of requests.

13. The apparatus of claim 11, wherein performing the one or more mitigation actions comprises:

modifying a reputation score associated with the client network application; and initiating a challenge process in response to a subsequent request from the client network application.

14. The apparatus of claim 11, wherein performing the one or more mitigation actions comprises:

blocking the request from transmittal to the origin server.

15. The apparatus of claim 11, wherein the instructions further cause said processor to perform the following:

store the one or more determined request attributes of the request and the session metrics in a data structure;

compare request attributes of subsequent requests to the determined request attributes of the requests in the data structure; and prevent one or more of the subsequent requests from being sent to the origin server when the request attributes of the one or more of the subsequent requests are similar to the determined request attributes of the requests in the data structure.

* * * * *